United States Patent
Wang et al.

(10) Patent No.: US 12,547,423 B2
(45) Date of Patent: Feb. 10, 2026

(54) METHOD FOR ACCESSING A BASEBOARD MANAGEMENT CONTROLLER USING A PLAYBOOK

(71) Applicant: Jabil Circuit (Singapore) Pte. Ltd., Singapore (SG)

(72) Inventors: Cheng-Huang Wang, Kaohsiung (TW); Chin Liang, New Taipei (TW); Jung-Te Chou, Taichung (TW)

(73) Assignee: Jabil Circuit (Singapore) Pte. Ltd., Singapore (SG)

( * ) Notice: Subject to any disclaimer, the term of this patent is extended or adjusted under 35 U.S.C. 154(b) by 91 days.

(21) Appl. No.: 18/615,058

(22) Filed: Mar. 25, 2024

(65) Prior Publication Data

US 2024/0394069 A1    Nov. 28, 2024

(30) Foreign Application Priority Data

May 25, 2023   (CN) .......................... 202310601854.4

(51) Int. Cl.
*G06F 9/44* (2018.01)
*G06F 9/445* (2018.01)

(52) U.S. Cl.
CPC ................................ *G06F 9/44505* (2013.01)

(58) Field of Classification Search
CPC ................ G06F 1/32; G06F 9/44; G06F 1/12
See application file for complete search history.

(56) References Cited

U.S. PATENT DOCUMENTS

| 12,363,154 | B1 * | 7/2025 | Roecks | ............... | H04L 63/1425 |
| 2014/0143865 | A1 * | 5/2014 | Collard | ................... | G06F 21/64 |
| | | | | | 726/22 |

FOREIGN PATENT DOCUMENTS

CN         113672580 A       11/2021

* cited by examiner

*Primary Examiner* — Keshab R Pandey
(74) *Attorney, Agent, or Firm* — Young Basile Hanlon & MacFarlane, P.C.

(57) ABSTRACT

A method for accessing a BMC using a playbook includes steps of: receiving from an initiator a playbook that includes to-be-executed instructions, a plurality of execution durations, a summarizing instruction, and a series of storing instructions; in response to receiving the playbook, the BMC executing the to-be-executed instructions; the BMC generating an execution result related to the to-be-executed instructions after executing the to-be-executed instructions; after generating the execution result, the BMC executing the summarizing instruction and summarizing the execution result according to a predetermined summarizing manner to obtain a summarizing result; and, after obtaining the summarizing result, the BMC executing the series of storing instructions and storing the execution result and the summarizing result according to a predetermined storing manner.

12 Claims, 4 Drawing Sheets

METHOD FOR ACCESSING A BASEBOARD MANAGEMENT CONTROLLER USING A PLAYBOOK

CROSS-REFERENCE TO RELATED APPLICATION

This application claims priority to Chinese Invention patent application No. 202310601854.4, filed on May 25, 2023 and incorporated by reference herein in its entirety.

FIELD

The disclosure relates to a method for accessing a baseboard management controller, and more particularly to a method for accessing a baseboard management controller using a playbook.

BACKGROUND

Redfish® is a standard specification that provides a RESTful interface, such as a REST (Representational State Transfer) API (application program interface), which utilizes common Web technologies, e.g. JSON format, etc., for managing platforms. In the case of an administrator sending Redfish commands to a baseboard management controller (BMC) of a platform/server to command the BMC to read and inventory data, since the data typically includes a lot of information about a variety of components of the platform/server (e.g., a basic input/output system, the BMC, a central processing unit, a memory device, a PCIe interface card, and a storage device), the BMC needs to implement a process including collecting the information, generating JSON files related to the information, storing the files in an internal Redfish database, and then sending each file back to the administrator through the REST API.

The above-mentioned process involves numerous commands, and the administrator, after giving a command, has to wait for the resources that are necessary for implementing the process to be available before giving another command, which is time-consuming. Thus, the time interval between every successive two of the commands needs to be controlled by the administrator. If the time interval is too short, it may result in incorrect retrieval of the information; if the time interval is too long, the process of retrieving the information would be inefficient. Taking firmware update as an example, a conventional approach relies on the administrator to set a timer to determine whether the server has rebooted successfully before giving a command to read the firmware that has been updated; if the timer is not set properly, the administrator may not be able to correctly determine whether the firmware version has been updated.

SUMMARY

Therefore, an object of the disclosure is to provide a method for accessing a baseboard management controller (BMC) using a playbook that can alleviate at least one of the drawbacks of the prior art.

According to the disclosure, the method for accessing a baseboard management controller (BMC) includes the following steps.

First, the BMC receives from an initiator a playbook that includes to-be-executed instructions, a plurality of execution durations corresponding to the to-be-executed instructions, a summarizing instruction for summarizing an execution result related to the to-be-executed instructions according to a predetermined summarizing manner, and a series of storing instructions for storing the execution result related to the to-be-executed instructions and a summarizing result related to the summarizing instruction according to a storing manner.

In response to receiving the playbook, the BMC executes the to-be-executed instructions. After executing the to-be-executed instructions, the BMC generates the execution result related to the to-be-executed instructions.

After generating the execution result, the BMC executes the summarizing instruction and summarizes the execution result according to the predetermined summarizing manner to obtain a summarizing result.

After obtaining the summarizing result, the BMC executes the series of storing instructions and stores the execution result and the summarizing result according to the predetermined storing manner.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
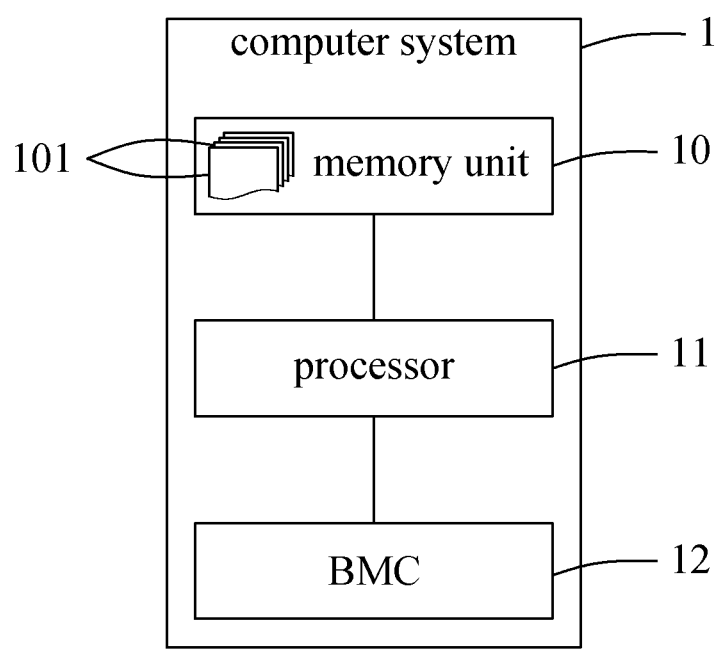
FIG. 1 is a block diagram illustrating a computer system that implements a method for accessing a BMC using a playbook, according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a method for accessing a BMC using a playbook according to the disclosure is implemented by a computer system 1. The computer system 1 includes a processor 11, a memory unit 10 electrically connected to the processor 11, and a baseboard management controller (BMC) 12 communicatively connected to the processor 11. The processor 11 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc. The memory unit 10 may be embodied using, for example, random access memory (RAM), read only memory (ROM), programmable ROM (PROM), firmware, and/or flash memory, etc. The memory unit 10 stores a plurality of playbooks 101 and software including instructions that, when executed by the processor 11, cause the processor 11 to serve as an initiator and to provide the plurality of playbooks 101 to the BMC 12.

In this embodiment, the playbooks 101 may be written, for example, in a form of JSON or YAML, which is a declarative language, and may be presented as a series of commands (such as Redfish commands). In accordance with various requirements, these playbooks 101 may include, but not limited to, a playbook for firmware update, a playbook for software information detection, a playbook for hardware information detection, and a playbook for system state detection. The contents of each of the playbooks 101 may include a plurality of tasks, such as a task for deploying software, a task for configuring servers, and a task for managing network devices. These tasks are performed in a predetermined order, i.e., they are automated tasks. According to the disclosure, the playbooks 101 are designed to be idempotent, and thus the automated tasks, when executed across multiple servers and information technology (IT) infrastructures, will be completed without causing side effects even after numerous executions.

Figure 2:
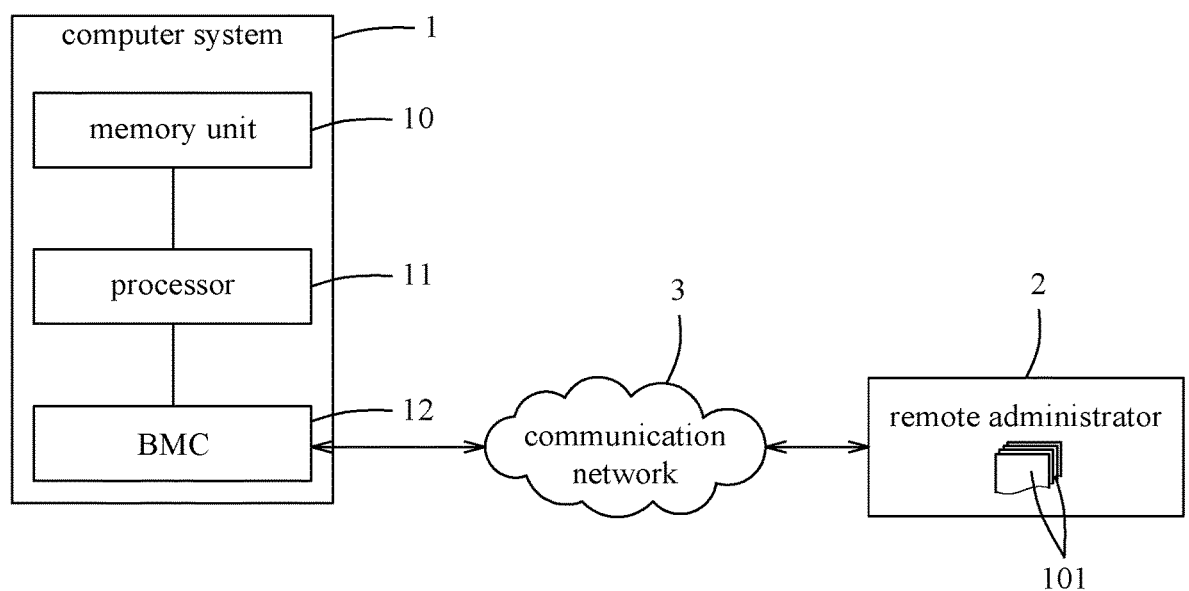
FIG. 2 is a block diagram illustrating a BMC of a computer system and a remote administrator that cooperatively implement the method for accessing a BMC using a playbook, according to another embodiment of the disclosure.

Such management in which the processor 11 sends commands (playbooks 101) to the BMC 12 to perform operations such as writing, reading, computing, etc., is called "In-Band" management. It is worth to note that in other embodiments, the BMC 12 of the computer system 1 may be connected with another computer system, i.e., a remote administrator 2, via a communication network 3 (see FIG. 2). The remote administrator 2 has the software and the playbooks 101 stored therein. Such management in which the remote administrator 2 acts as an initiator to send commands (playbooks 101) to the BMC 12 of the computer system 1, causing the BMC 12 to perform operations such as writing, reading, computing, etc., is called "Out-of-Band" management.

Figure 3:
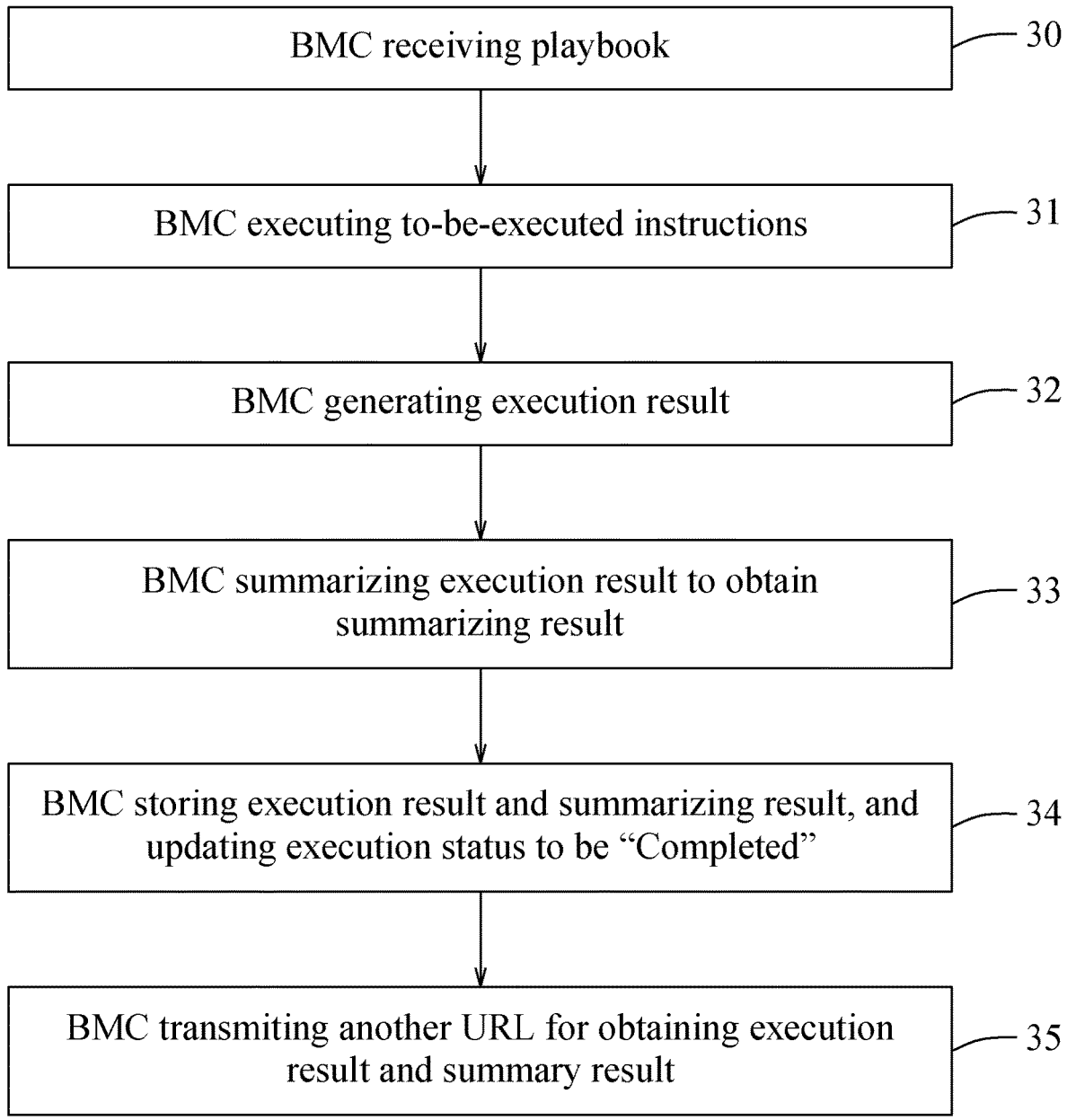
FIG. 3 is a flow diagram illustrating the method for accessing a BMC using a playbook according to the present disclosure.

Referring to FIGS. 1 and 3, an embodiment of the method for accessing a BMC using a playbook according to the disclosure includes the following steps.

In step 30, the initiator (either the processor 11 or the remote administrator 2) sends one of the playbooks 101 to the BMC 12 for accessing the BMC 12, and the BMC 12 receives the playbook 101. As mentioned above, the contents of the playbook 101 include a plurality of tasks, which, specifically, are embodied in a plurality of to-be-executed instructions, a plurality of execution durations corresponding to the to-be-executed instructions, a summarizing instruction for summarizing an execution result related to the to-be-executed instructions according to a predetermined summarizing manner, and a series of storing instructions for storing the execution result related to the to-be-executed instructions and a summarizing result related to the summarizing instruction according to a storing manner. The execution durations are defined to indicate durations of the to-be-executed instructions, respectively.

Figure 4:
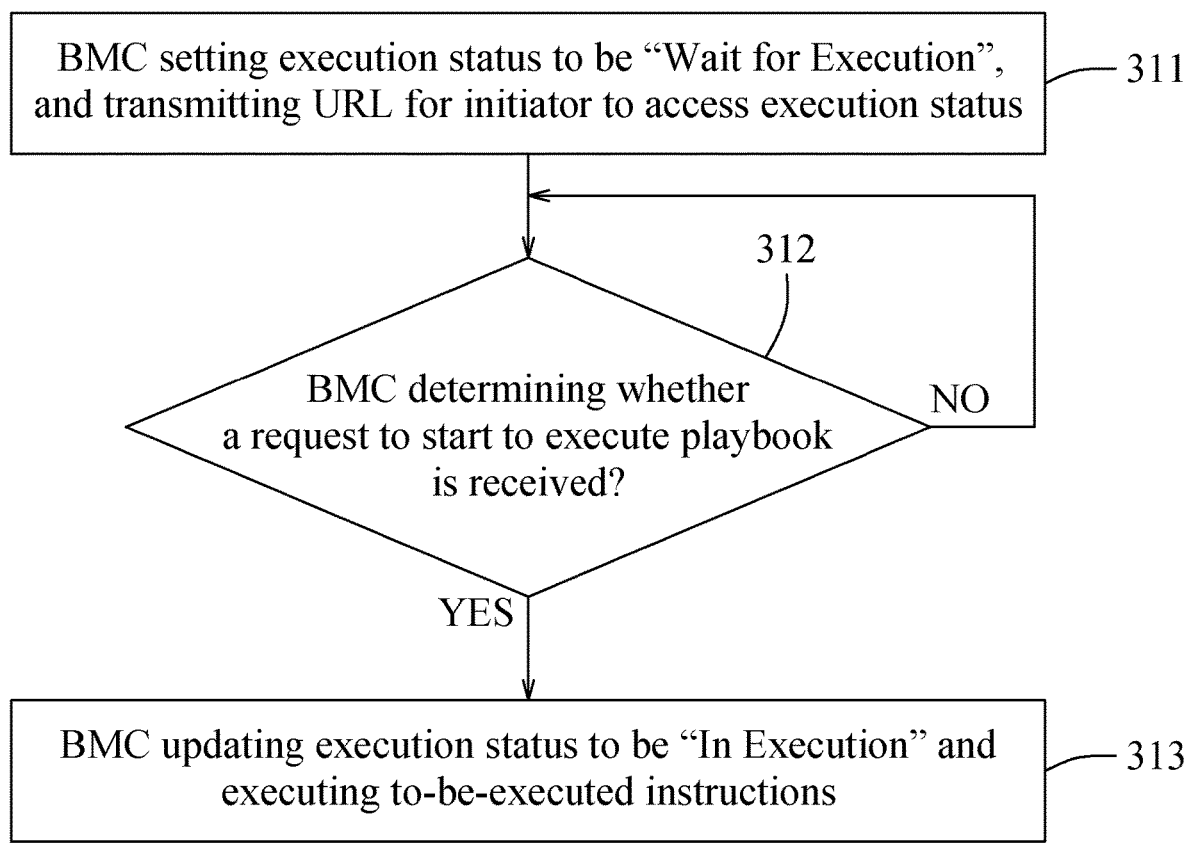
FIG. 4 is a flow diagram illustrating sub-steps to be executed by the BMC in response to receiving a playbook.

In step 31, in response to receiving the playbook 101 from the initiator, the BMC 12 executes the to-be-executed instructions. It is worth to note that step 31 includes the following sub-steps (see FIG. 4).

In sub-step 311, in response to the BMC 12 receiving the playbook 101, the BMC 12 sets an execution status of the playbook 101 to "Wait for Execution," and transmits, to the initiator, a Uniform Resource Locator (URL) for obtaining the execution status of the playbook 101 in the BMC 12.

In sub-step 312, the BMC 12 determines whether a request to start to execute the playbook 101 is received. When the BMC 12 determines that a request to start to execute the playbook 101 is received, the flow goes to sub-step 313. When the BMC 12 determines that a request to start to execute the playbook 101 has not been received, the flow goes back to sub-step 312.

In sub-step 313, the BMC 12 updates the execution status of the playbook 101 to "In Execution" and executes the to-be-executed instructions of the playbook 101.

In step 32, the BMC 12 generates the execution result related to the to-be-executed instructions after executing the to-be-executed instructions. In the case where the playbook 101 is a playbook for hardware information detection, the execution result may contain a variety of details relating to hardware.

In step 33, after generating the execution result, the BMC 12 executes the summarizing instruction and summarizes the execution result according to the predetermined summarizing manner to obtain the summarizing result. The predetermined summarizing manner may involve use of a plurality of regular expressions for summarizing the execution result, wherein each of the plurality of regular expressions may be a regular expression for retrieving the content of the execution result corresponding to a specific argument, or a regular expression for retrieving an alert message, e.g., a warning, error, or failure message, found within the execution result. The specific argument may be, for example, an identifier, name or location of a specific hardware device. For example, the specific hardware device may be a network card, and the specific argument may be the identifier of the network card such as "001," the name of the network card such as "Intel I210," or the location of the network card such as "Slot1."

In step 34, after obtaining the summarizing result, the BMC 12 executes the series of storing instructions and stores the execution result and the summarizing result according to a predetermined storing manner. Furthermore, the BMC 12 updates the execution status of the playbook to "Completed." The storing manner involves using a predefined storage location and a predefined storage format for storing both the execution result and the summarizing result. For example, the predefined storage location may specify a designated file (which may include a table) in which the execution result and the summarizing result are to be stored, and the predefined storage format may define a format of the designated file.

In step 35, after storing the execution result and the summarizing result, the BMC 12 transmits, to the initiator, another URL for obtaining the execution result of the playbook 101 and the summarizing result.

In summary, since the content of the playbook 101 is a series of tasks which are specifically embodied in the to-be-executed instructions and the execution durations, etc., the BMC 12 is able to execute these to-be-executed instructions according to a predetermined timing schedule, thus increasing processing efficiency as a whole and reducing the costs of trial and error, such as expenses associated with errors that, e.g., result from improper timer settings. For example, when the playbook is related to firmware update, the initiator only needs to provide the playbook for firmware update to the BMC 12 for execution. The BMC 12 executes the series of tasks of the playbook for firmware update until the computer system 1 needs to be rebooted. The BMC 12 then reboots the processor 11 and subsequently verifies successful reboot of the computer system 1 according the playbook 101, thereby enabling the retrieval of the updated firmware. That is, instead of an administrator sending multiple instructions as in the prior art, the BMC 12 automatically executes tasks in a predetermined order. Furthermore, when executing the playbook 101, the BMC 12 generates the execution result, and further summarizes the execution result and stores the summarizing result, which has enhanced value and readability than the execution result.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for accessing a baseboard management controller (BMC), comprising:
the BMC receiving from an initiator a playbook that includes to-be-executed instructions, a plurality of execution durations corresponding to the to-be-executed instructions, a summarizing instruction for summarizing an execution result related to the to-be-executed instructions according to a predetermined summarizing manner, and a series of storing instructions for storing the execution result related to the to-be-executed instructions and a summarizing result related to the summarizing instruction according to a storing manner;
in response to receiving the playbook, the BMC executing the to-be-executed instructions;
the BMC generating the execution result after executing the to-be-executed instructions;
after generating the execution result, the BMC executing the summarizing instruction and summarizing the execution result according to the predetermined summarizing manner to obtain a summarizing result; and
after obtaining the summarizing result, the BMC executing the series of storing instructions and storing the execution result and the summarizing result according to the predetermined storing manner.

2. The method as claimed in claim 1, wherein the playbook that is received by the BMC is presented as a series of commands, and is one of a playbook for firmware update, a playbook for software information detection, a playbook for hardware information detection, and a playbook for system state detection.

3. The method as claimed in claim 1, wherein executing the to-be-executed instructions includes:
setting an execution status of the playbook to "Wait for Execution," and transmitting, to the initiator, a Uniform Resource Locator (URL) for obtaining the execution status of the playbook in the BMC;
determining whether a request to start to execute the playbook is received; and
when it is determined that a request to start to execute the playbook is received, updating the execution status of the playbook to "In Execution" and executing the to-be-executed instructions of the playbook.

4. The method as claimed in claim 3, further comprising, after obtaining the summarizing result, the BMC updating the execution status of the playbook to "Completed".

5. The method as claimed in claim 4, after storing the execution result and the summarizing result, the BMC transmitting, to the initiator, another URL for obtaining the execution result of the playbook and the summarizing result.

6. The method as claimed in claim 1, wherein the predetermined storing manner involves using a predefined storage location and a predefined storage format for storing both the execution result and the summarizing result.

7. The method as claimed in claim 6, wherein the predefined storage location specifies a designated file in which the execution result and the summarizing result are to be stored.

8. The method as claimed in claim 7, wherein the predefined storage format defines a format of the designated file in which the execution result and the summarizing result are to be stored.

9. The method as claimed in claim 1, wherein the summarizing manner involves use of a plurality of regular expressions for summarizing the execution result, wherein each of the plurality of regular expressions is one of a regular expression for retrieving the content of the execution result corresponding to a specific argument, and a regular expression for retrieving an alert message found within the execution result.

10. The method as claimed in claim 9, wherein the specific argument is one of an identifier, a name and a location of a specific hardware device.

11. A computer system, comprising a processor, a memory unit electrically connected to said processor, and a baseboard management controller (BMC) communicatively connected to said processor, wherein said memory unit stores a playbook and software including instructions that, when executed by said processor, cause said processor to serve as an initiator and to provide the playbook to said BMC so as to cause said BMC to implement the method as claimed in claim 1.

12. A remote administrator system, comprising a computer system and a remote administrator connected to said computer system via a communication network, said computer system including a baseboard management controller (BMC), and said remote administrator having software and a playbook stored therein, the software including instructions that, when executed by said remote administrator, cause said remote administrator to act as an initiator to send the playbook to said BMC so as to cause said BMC to implement the method as claimed in claim 1.

* * * * *